Aug. 3, 1943. M. G. SHOEMAKER 2,325,804
CRANKSHAFT
Filed Aug. 17, 1940
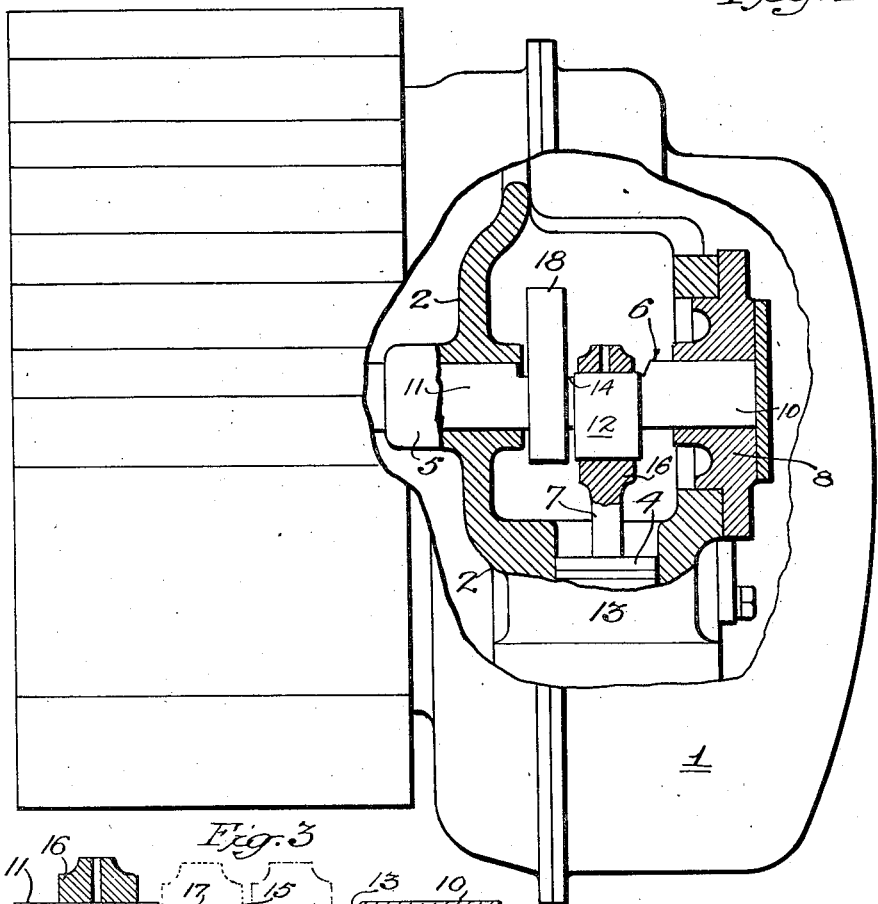
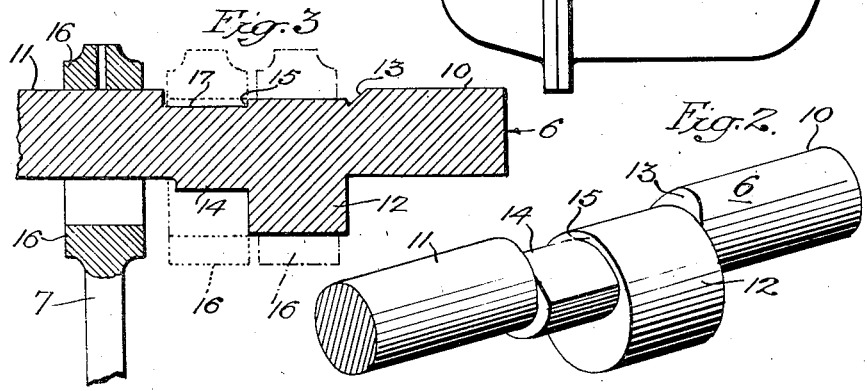
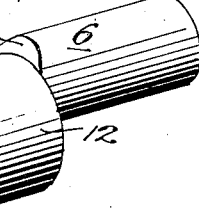
Inventor.
Malcolm G. Shoemaker
by his Attorneys
Howson & Howson Patented Aug. 3, 1943

2,325,804

UNITED STATES PATENT OFFICE 2,325,804

CRANKSHAFT

Malcolm G. Shoemaker, Abington, Pa., assignor, by mesne assignments, to Philco Corporation, Philadelphia, Pa., a corporation of Pennsylvania.

Application August 17, 1940, Serial No. 353,143

4 Claims. (Cl. 74—595)

This invention relates to new and useful improvements in crankshafts and the construction and arrangement thereof, as well as the method of assembling thereon a connecting rod and counterweight member.

More particularly the invention relates to a crankshaft, connecting rod and counterweight assembly, wherein the eccentric bearing portion of the crankshaft is recessed with respect to the surface of said crankshaft. Specifically, this invention is concerned with the crankshaft, connecting rod and counterweight assembly for motor compressor units of domestic refrigerators.

In the construction and arrangement of a crankshaft, it is desirable in many instances, to recess the connecting rod eccentric bearing surface with respect to the surface of said crankshaft. This is so because it permits of a minimum bearing surface area with consequent low friction losses, and, also, because it is then possible to change the length of the throw afforded by merely varying the extent of the offset of such eccentric bearing portion instead of varying the diameter of such portion and hence its bearing surface area. Too, with such an arrangement, there is considerably less weight required to be counter-balanced.

On the other hand, the one real disadvantage of crankshafts having recessed connecting rod eccentric bearing surfaces is that it has been necessary, heretofore, to construct the connecting rod bearing in two pieces in order to be able to mount the connecting rod on the recessed eccentric portion of the crankshaft, and this required use of a split or two-piece connecting rod bearing has necessarily maintained the cost thereof at a relatively high level. Also, there is the disadvantage of having periodically to tighten such bearings because of their tendency to become loose through continued operation.

Now, in instances where the required throw to be afforded by a crankshaft is not too great, I have discovered that it is entirely possible to provide a crankshaft having a recessed eccentric bearing surface portion on which a one-piece connecting rod bearing may be readily mounted, and, with the foregoing observations in mind, the principal object of the present invention is to provide a crankshaft having a recessed eccentric bearing surface on which a one-piece connecting rod bearing may readily and easily be mounted thereon.

Another object of the invention is to provide a crankshaft construction of the character set forth which is particularly adaptable for assembly and use within the space limitations of motor compressor units for domestic refrigerators.

A further object of the invention is to provide a crankshaft and connecting rod assembly which is substantially less expensive than heretofore and which does not require any further attention and adjustment after it is installed and operating.

These and other objects of the invention and the various features and details of the construction and assembly thereof are hereinafter fully set forth and shown in the accompanying drawing, in which:

Figure 1 is a side elevation of a domestic refrigerator motor compressor unit, a portion thereof being cut away and shown in section to illustrate one embodiment of the present invention operatively assembled therein.

Figure 2 is a view in perspective of a crankshaft made according to the present invention; and Figure 3 is a partial section axially through the shaft shown in Figure 2 illustrating the method of mounting thereon a connecting rod having a one-piece bearing.

For purposes of illustration, the invention is described in connection with the motor compressor unit of a domestic refrigerator, and referring now to the drawing, reference numeral 1 designates an hermetically sealed metal shell supporting therein a frame structure 2 comprising a compressor cylinder 3 for a piston 4 and a bearing 5 for a crankshaft 6. The crankshaft 6 is driven from an electric motor (not visible) suitably mounted within said shell 1 above the frame 2, and in turn reciprocates the piston 4 through a connecting rod 7. The lower end of the crankshaft 6 is journalled in a bearing 8 detachably connected to the frame structure 2 by means of screws or the like.

In any such mechanism wherein the crankshaft is provided with a recessed eccentric bearing surface portion to receive the connecting rod bearing it has been impossible, heretofore, to employ a one-piece connecting rod bearing, since the offset of the eccentric bearing portion and the construction of the crankshaft adjacent thereto are such that it is not possible to slide a one-piece bearing axially along the shaft and onto said offset eccentric portion. This is so for the reason that there is no provision for allowing the connecting rod bearing likewise to be offset and aligned with the offset eccentric bearing surface of the crankshaft thereby to enable the connecting rod bearing to be slid onto the said eccentric. Hence the need, heretofore, for connecting rod bearings of the conventional split or two-piece type construction.

The foregoing notwithstanding, I have devised a crankshaft which is constructed and arranged to permit of the mounting of a one-piece connecting rod bearing on the offset eccentric bearing surface portion, and referring particularly to Figures 2 and 3 of the accompanying drawing a crankshaft made in accordance with my invention comprises axially aligned main shaft portions 10 and 11, the common axes of which are coincident with the fixed axis of rotation of the crankshaft as a whole. Intermediate these main shaft portions 10 and 11 of the crankshaft there is formed the usual eccentric bearing surface portion 12 for receiving the connecting rod bearing and, as shown, this eccentric portion 12 is recesses inwardly with respect to the surface of the adjacent main shaft portion 10 as indicated at 13 in order to impart the necessary throw to the connecting rod 7 with the desired small diameter connecting rod bearing. In this arrangement, the radius of the eccentric bearing surface may be, and, in fact, is less than the sum of the throw plus the radius of the main shaft portion of the connecting rod 7 and the use of a minimum bearing surface area with low friction losses is thereby permitted.

Adjacent the eccentric 12 and between it and the shaft portion 11, there is provided a shaft portion 14 and as shown, this portion 14 likewise is offset or recessed with respect to the main shaft portions 10 and 11. It is essential that the extent of recess or offset of this portion 14 be at least as great as that of the eccentric bearing portion 12, and the portion 14 preferably is recessed a distance slightly greater than said eccentric portion 12 as indicated at 15. In every event, however, the recessed offset of the portions 12 and 14 is in the same direction laterally of the axis of the crankshaft. Preferably, the portion 14 likewise is of eccentric form and projects beyond the main shaft portion 11 opposite the offset thereof in order to impart sufficient strength to the crankshaft against breaking due to torsional stresses and at the same time provide a suitable portion for the mounting thereon of a counter weight.

By providing this recessed shaft portion 14 intermediate the main shaft portion 11 and the eccentric bearing portion 12, it will be seen that sufficient clearance is thereby afforded to enable the one-piece bearing 16 of the connecting rod 7 to be passed over the shaft portion 11 as shown in solid lines in Figure 3 and then dropped into the recess 17 afforded by the portion 14 so that said connecting rod bearing 16 is disposed in axial alignment with the said eccentric bearing 12 as shown in dotted lines in said figure. With the connecting rod bearing 16 thus aligned with the eccentric bearing surface 12, the said bearing 16 may then be passed readily over onto the eccentric bearing portion 12 as shown in dot and dash lines in said Figure 3. After the connecting rod bearing 16 has thus been positioned upon the eccentric 12 a counterweight 18 of suitable size and shape may then be positioned upon the recessed eccentric portion 14 and secured thereon in predetermined circumferential relation by means of a set screw or the like.

Assembly of the connecting rod, counter-weight upon the crankshaft of the present invention within the space limitations of the motor-compressor unit of a domestic refrigerator may be accomplished readily and easily by first inserting into the cylinder 3 the piston 4 with its connecting rod 7 thereto attached. When this has been done, the counter-weight 18 may be held by the fingers of the left hand in a position intermediate the connecting rod bearing 16 and the bearing 5 of the frame 2, and the crankshaft then may be passed upwardly through the connecting rod bearing 16, the counter-weight 18 and the frame bearing 5, it being necessary, during such upward passage of the crankshaft, that the same be rotated back and forth in order that the connecting rod bearing 16 will pass over the shaft and its relatively recessed portion 14 onto the eccentric bearing surface portion 12 thereof. When this has been done the shaft may be held in position by securing in place the bottom bearing plate 8.

Thus it will be seen that the present invention permits of the use of a crankshaft having a recessed connecting rod bearing surface 12 with all of the previously mentioned advantages of that construction, and at the same time permits of the use in conjunction with such crankshaft of a connecting rod having a one-piece bearing thereby substantially reducing the cost of the connecting rod bearings below that of the split or two-piece type and eliminating entirely the necessity of having periodically to tighten any connecting rod bearing parts as in the case of bearings of the said split or two-piece type.

The invention, of course, may be embodied to advantage in the crankshaft assemblies of mechanism other than the motor-compressor units for domestic refrigerators, and while a particular embodiment of said invention has been illustrated and described herein, it is not intended that the invention be limited to that disclosure but that changes and modifications may be made and incorporated therein within the scope of the annexed claims.

I claim:

1. A crankshaft comprising at least two spaced axially aligned shaft portions of predetermined diameter, an eccentric crank portion of a diameter at least as great as said main shaft portions disposed intermediate said main shaft portions and providing a connecting rod bearing surface, said crank portion being recessed and offset with respect to the surface of said axially aligned main shaft portions, and a second recessed portion having an axial length at least as great as the axial length of the bearing surface of said crank portion interposed between the latter and one of said main shaft portions, said second recessed portion being recessed with respect to the surface of the main shaft portions in the direction of offset and a distance at least as great as the said crank portion, and the extreme projection of said second recessed portion in the direction of offset of the crank portion terminating inwardly of the extreme projection of said crank portion a distance at least as great as the distance that the crank portion is recessed with respect to the surface of said main shaft portions.

2. In a motor compressor mechanism for domestic refrigerators comprising a frame providing a bearing and a compression cylinder in which a piston is reciprocated by a connecting rod having a one-piece bearing, a crankshaft for actuating said connecting rod journalled in said frame bearing and comprising spaced axially aligned main shaft portions of predetermined diameter, an eccentric crank portion of a diameter at least as great as said main shaft portions disposed intermediate said main shaft portions and providing a connecting rod bearing surface, said crank portion being recessed and offset with respect to the surface of said axially aligned main shaft portions, and a second recessed portion having an axial length at least as great as the axial length of the bearing surface of said crank portion interposed between the latter and one of said main shaft portions, said second recessed portion being recessed with respect to the surface of the main shaft portions in the direction of offset and a distance at least as great as the said crank portion, and the extreme projection of said second recessed portion in the direction of offset of said crank portion terminating inwardly of the extreme projection of the crank portion and a distance at least as great as the distance that the crank portion is recessed with respect to the surface of said main shaft portions.

3. A device as claimed in claim 1 wherein the second recessed portion of the crankshaft provides a counterweight mounting portion and has a counterweight element removably mounted thereon.

4. A device as claimed in claim 2 wherein the second recessed portion of the crankshaft provides a counterweight mounting portion and has a counterweight element removably mounted thereon.

MALCOLM G. SHOEMAKER.

Disclaimer 2,325,804.—*Malcolm G. Shoemaker*, Abington, Pa. CRANKSHAFT. Patent dated Aug. 3, 1943. Disclaimer filed June 12, 1948, by the assignee, *Philco Corporation*.

Hereby enters this disclaimer to claims 1 to 4 inclusive of said patent.

[*Official Gazette August 17, 1948.*]